Figure 1:
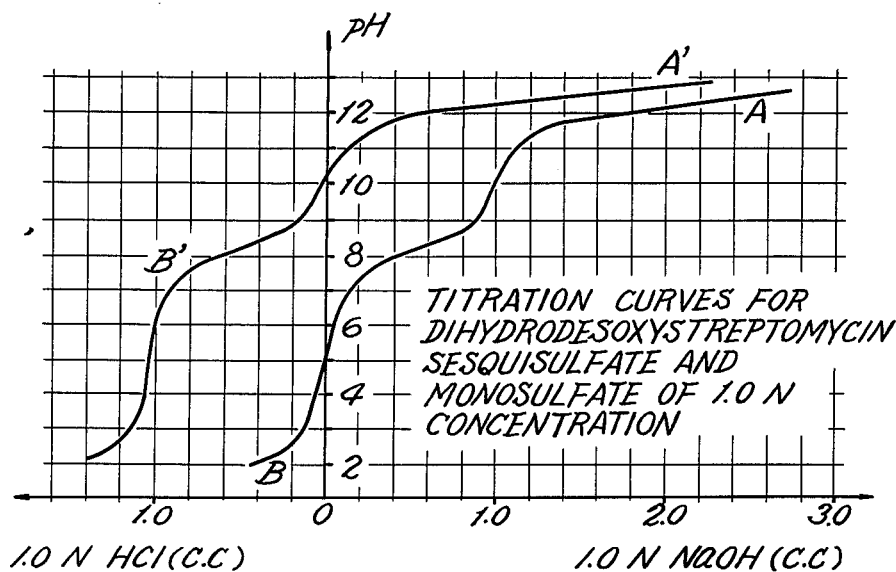

United States Patent Office 3,221,009
Patented Nov. 30, 1965

3,221,009
CRYSTALLINE BASIC SALTS OF THE REDUCTION PRODUCTS OF STREPTOMYCIN AND PROCESS FOR PREPARING SAME
Teijiro Yabuta, Hiroshi Ikeda, Kenji Shiroyanagi, Hatsuko Ikeda, Itsuo Fujimaki, Mitsuhiko Katayama, Keiichi Tsuji, and Tomonori Sato, all of Tokyo, Japan, assignors to Rikagaku Kenkyusho, Bunkyo-ku, Tokyo, Japan, a corporation of Japan
Continuation of application Ser. No. 766,373, Oct. 8, 1958. This application July 29, 1963, Ser. No. 298,220
Claims priority, application Japan, Mar. 9, 1958, 33/6,159
18 Claims. (Cl. 260—210)

This application is a continuation of application, Serial No. 766,373, filed October 8, 1958, now abandoned.

The present invention relates to novel derivatives of streptomycin compounds, and to the process of preparing them. These derivatives are crystalline basic salts of either dihydrodesoxystreptomycin or dihydrostreptomycin, wherein the primary amino groups contained in each of the streptidine residues of said streptomycin compounds are combined with an acid and wherein the secondary amino group contained in each of the N-methyl-L-glucosamine residues of said streptomycin compounds is in the free base form.

Originally, dihydrodesoxystreptomycin is a substance discovered by the present inventors and is a superior tuberculostatic agent because it is perfectly free from such side reactions as damage for eighth cranial nerve etc. which are apt to take place in the use of the known substances of streptomycin and dihydrostreptomycin. The chemical investigation of dihydrodesoxystreptomycin was first reported by the present inventors in "Proceedings of the Japan Academy," vol. 32, 48; 53 (1956).

The molecular formula of this substance is $$C_{21}H_{41}N_7O_{11}$$

and has the following chemical structure:

On the other hand, the chemical structure of the heretofore known substance of dihydrostreptomycin is as follows:

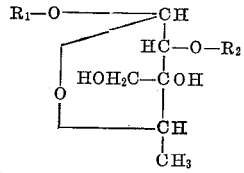

As mentioned above, dihydrodesoxystreptomycin and dihydrostreptomycin consist of three molecules being respectively connected by oxygen. The left-hand part of the above-mentioned chemical structural formula denotes streptidine residue ($R_1$), while the right-hand one denotes N-methyl-L-glucosamine residue ($R_2$). As is clear from the above-described chemical structural formulas, both dihydrodesoxystreptomycin and dihydrostreptomycin have three amino groups, two of which are primary amino groups in the streptidine residue, and the remaining one is a secondary amino group in the N-methyl-L-glucosamine residue.

The substances obtainable by the present invention are the basic salts of dihydrodesoxystreptomycin or dihydrostreptomycin, i.e., the basic salts wherein acid is combined with two amino groups of the above-described streptidine residue of dihydrodesoxystreptomycin or dihydrostreptomycin, while the remaining amino group in N-methyl-L-glucosamine residue is in the free base form.

Explanations are given below together with some concrete examples:

(1) Dihydrodesoxystreptomycin monosulfate:
Molecular formula—$C_{21}H_{41}N_7O_{11} \cdot H_2SO_4$
Rational formula—

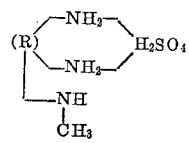

(R)—Dihydrodesoxystreptomycin residue

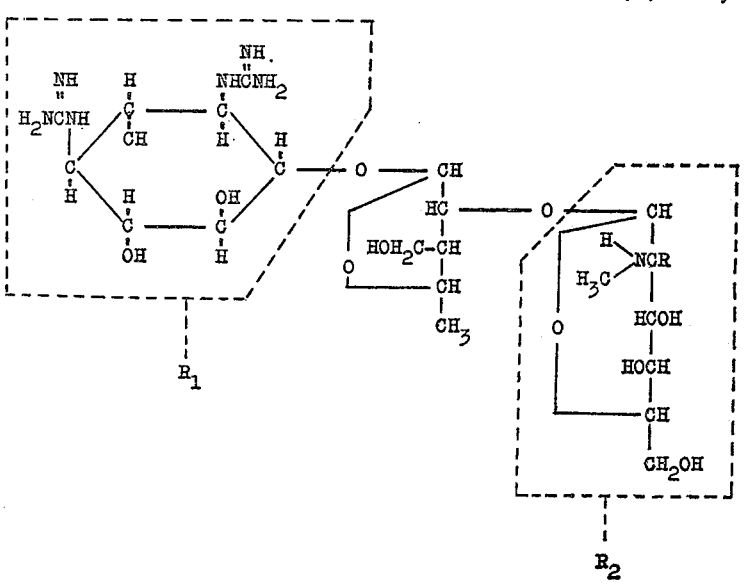

(2) Dihydrodesoxystreptomycin dihydrochloride:
Molecular formula—$C_{21}H_{41}N_7O_{11} \cdot 2HCl$
Rational formula—

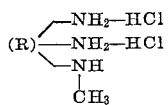

(3) Dihydrodesoxystreptomycin monophosphate:
Molecular formula—$C_{21}H_{41}N_7O_{11} \cdot H_3PO_4$
Rational formula—

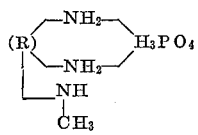

(4) Dihydrodesoxystreptomycin diacetate:
Molecular formula—$C_{21}H_{41}N_7O_{11} \cdot 2CH_3COOH$

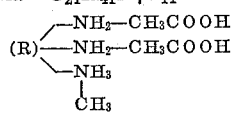

It is an object of our invention to provide a method for preparing new crystalline basic salts of the reduction products of streptomycin as described above in a simple way and with a high yield.

The basic salts are useful in the preparation of purified reduction products of streptomycin through their ability to form crystals of high purity.

We shall state below in detail about the method of the present invention.

The present inventors through their researches have discovered that the two amino groups in the streptidine residue contained in the molecules of dihydrodesoxystreptomycin or dihydrostreptomycin are completely ionized and become strongly basic in the solution but that the base in N-methyl-L-glucosamine residue is very weakly basic.

These characteristics are utilized in the practice of this invention to produce novel crystalline basic salts of dihydrostreptomycin and dihydrodesoxystreptomycin, and to prepare a purified product, as will be made clear from the following disclosure.

Figure 2:
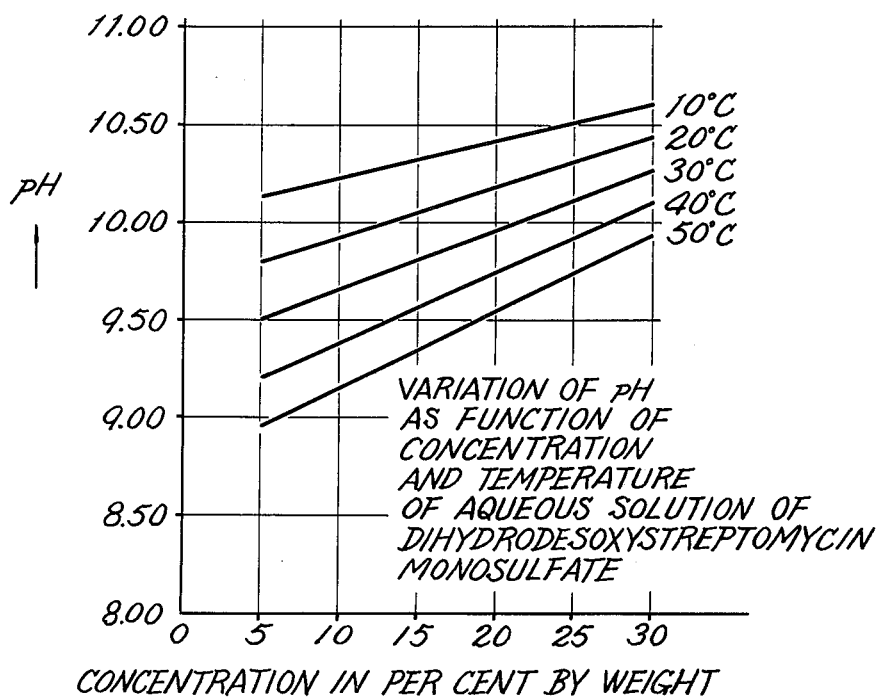

FIGURE 1 is a graph showing titration curves obtained by the respective addition of 1 normal sodium hydroxide and 1 normal hydrochloric acid to dihydrodesoxystreptomycin sesquisulfate and monosulfate. FIGURE 2 is a graph representing titration curves that show changes in pH caused by the concentration and temperature of aqueous solution if dihydrodesoxystreptomycin monosulfate.

0.715 g. (0.001 mole) of dihydrodesoxystreptomycin sesquisulfate being a kind of normal salt of dihydrodesoxystreptomycin is dissolved in 10 cc. of water containing no carbonic acid gas, and the pH will be measured at about 4.8. When to this solution is added 1 normal sodium hydroxide from a burette and the pH is measured with a pH meter, a titration curve as shown in A of FIGURE 1 will be obtained. That is, after a quick ascent at the beginning, the curve becomes gradual and least steep in the neighborhood of pH 8.0. When the curve approaches to the point where 1.0 cc. of sodium hydroxide, or one equivalent to dihydrodesoxystreptomycin is added, it makes a sudden ascent again. This shows that the secondary base in N-methyl-L-glucosamine residue has become completely free at this point, and the pH at the equivalent point is about 10.1. By further addition of sodium hydroxide, the pH will ascend only gradually but will have no bending part. This means that the two bases in the streptidine residue have a very high degree of dissociation.

The curve B is the one obtained from the titration by 1 normal hydrochloric acid with regard to 10 cc. of the solution prepared from 0.715 gram of dihydrodesoxystreptomycin sesquisulfate dissolved in water, and it is clear that the substance in question does not contain further basic ion.

Next, 0.666 gm. (0.001 mole) of dihydrodesoxystreptomycin monosulfate processed in accordance with the method of the present invention is dissolved in sufficient water containing no carbonic acid gas to give 10 cc. of the solution, and the pH will be measured at about 10.1 which is equal to the pH attained when 1 equivalent of sodium hydroxide is added to dihydrodesoxystreptomycin sesquisulfate. When 1 normal sodium hydroxide is added to this solution and a titration curve is drawn, it will make a gradual ascent with no bending point, as is shown by A' in FIGURE 1. In the same manner, when the titration is made by the addition of 1 normal hydrochloric acid, the process will be exactly contrary to the case of A in FIGURE 1 as shown by B' in FIGURE 1, and the neutralization will take place at the point where 1 equivalent of the hydrochloric acid is added resulting in pH of 4.8. That is, in the case of dihydrodesoxystreptomycin monosulfate, with regard to its sesquisulfate, it is shown that the neutralized base in N-methyl-L-glucosamine residue is in a perfectly free state.

According to the above experiment, crystalline dihydrodesoxystreptomycin monosulfate is a substance whose molecule contains streptidine residue having two amino groups conbined with sulfuric acid and N-methyl-L-glucosamine residue having one free amino group.

Furthermore, the present inventors have found that the aqueous solution of the basic salts of the newly discovered dihydrodesoxystreptomycin or dihydrostreptomycin has a fixed pH of the various salts, and that the values of pH of the various salts vary slightly from each other as shown in the following table:

| Kinds of salts | Value of pH — Concentration of substance: 0.001 mole/10 cc. — Temperature: 15° C. |
|---|---|
| Dihydrodesoxystreptomycin monosulfate | 10.1 |
| Dihydrodesoxystreptomycin dihydrochloride | 10.1 |
| Dihydrodesoxystreptomycin monophosphate | 10.2 |
| Dihydrodesoxystreptomycin diacetate | 10.5 |
| Dihydrostreptomycin monosulfate | 10.2 |
| Dihydrostreptomycin dihydrochloride | 10.0 |
| Dihydrostreptomycin monophophosphate | 10.3 |
| Dihydrostreptomycin diacetate | 10.7 |

The present inventors, based upon the newly acquired knowledge as mentioned above, have accomplished a new process for obtaining the crystals of basic salts of dihydrodesoxystreptomycin or dihydrostreptomycin by making a solution out of the free base or normal salts of dihydrodesoxystreptomycin or dihydrostreptomycin and by adjusting its pH at 7.2–13.0 and afterwards by crystallizing it.

Below, we shall explain about the various methods of the present invention:

METHOD 1

The method in which basic substance is added to the solution of normal salt of dihydrodesoxystreptomycin or dihydrostreptomycin and pH of the solution is adjusted to about 10.

To the aqueous solution of normal salts of dihydrodesoxystreptomycin or dihydrostreptomycin is added the basic substance and the pH of the solution is adjusted to the value of pH (concentration: 0.001 mole/10 cc.; temperature: 15° C.) as shown in Table 1. (Care should be taken as there may be more or less change in the value of pH according to the change in the concentration and temperature of the solution. For instance, as the concentration and temperature of the aqueous solution of dihydrodesoxystreptomycin are related to pH in such a way as mentioned in FIGURE 2, the purpose of preparing the above-mentioned monosulfate in accordance with the method of the present invention may be attained if we first measure the concentration and temperature of the solution and then determine the pH by referring to FIGURE 2.) Next, to this solution is added a water miscible organic solvent, and we can obtain the crystals of basic salts that are corresponding to the normal salts used as starting material. We will explain below about this method showing some concrete examples.

To the aqueous solution of dihydrodesoxystreptomycin sesquisulfate is added barium hydroxide adjusting the solution to about pH 10.0, and the precipitate of the resulting barium sulfate is removed by filtration. To the filtrate is then added methanol and allowed to stand, and dihydrodesoxystreptomycin monosulfate will crystallize out quantitatively. It is also possible to manufacture the crystals of monosulfate when basic ion exchange resin, instead of barium hydroxide, is added to the solution of sesquisulfate as mentioned above, and after adjusting the solution to about pH 10.0, the resin is filtered off and methanol is added to the filtrate.

METHOD 2

The method in which the quantity of basic substance to be added to the solution of normal salt of dihydrostreptomycin or dihydrodesoxystreptomycin is only enough to neutralize the acid attached to the one amino group in N-methyl-L-glucosamine residue of the normal salt.

For instance, as dihydrodesoxystreptomycin sesquisulfate is equal to 1 mole of dihydrodesoxystreptomycin to which 1.5 mole acid is added, of which 0.5 mole is attached to N-methyl-L-glucosamine residue, when sufficient quantity of barium hydroxide is added to neutralize this 0.5 mole of sulfuric acid, only this 0.5 mole of sulfuric acid is removed as the precipitate of barium sulfate. The pH of the filtrate will be about 10.1, and in this filtrate dihydrodesoxystreptomycin monosulfate is present in dissolved form. An addition of water-miscible solvents to this filtrate will crystallize out the above-mentioned monosulfate. (In this case, the crystals of monosulfate can also be obtained by concentrating the filtrate, instead of adding solvents and afterwards by cooling it.)

METHOD 3

The method in which acid is added to the solution of free base of dihydrodesoxystreptomycin or dihydrostreptomycin and the pH of the solution is adjusted to about 10.

The principle for this method is the same as the one for method 1. As a concrete example, sulfuric acid is added to the aqueous solution of the free base of dihydrodesoxystreptomycin or dihydrostreptomycin, and the pH of the solution is adjusted to about pH 10.0. Methanol is added to this solution then the crystals of dihydrodesoxystreptomycin or dihydrostreptomycin can be obtained.

METHOD 4

The method in which a fixed quantity of acid is added to the solution of free base of dihydrodesoxystreptomycin or dihydrostreptomycin.

In this method, the solution of free base of dihydrodesoxystreptomycin or dihydrostreptomycin is mixed with acid the quantity of which is just enough to neutralize only the two amino groups existing in the streptidine residue contained in the molecules of the starting materials, as is easily seen from the molecular formulas of these starting materials. This will bring the solution to about pH 10, and the basic salt will be produced in the solution. For instance, the molecular formula of dihydrodesoxystreptomycin monosulfate being $$C_{21}H_{41}N_7O_{11} \cdot H_2SO_4$$

the crystals of dihydrodesoxystreptomycin monosulfate can be obtained by adding first 1 mole of sulfuric acid and afterwards methanol to the aqueous solution of 1 mole of free base of dihydrodesoxystreptomycin.

METHOD 5

The method in which the solution of 1 mole of free base of dihydrodesoxystreptomycin or dihydrostreptomycin is mixed with the solution of 2 moles of normal salt of dihydrodesoxystreptomycin or dihydrostreptomycin, as described in the following examples.

(A) The aqueous solution of 1 mole of free base of dihydrodesoxystreptomycin is mixed with the aqueous solution of 2 moles of dihydrodesoxystreptomycin sesquisulfate bringing about the chemical reaction set forth in the formula below and causing the pH of the mixture to be about 10 and dihydrodesoxystreptomycin monosulfate come to be produced in the mixture. Methanol is added to this mixture and crystals of dihydrodesoxystreptomycin monosulfate can be obtained.

$$(C_{21}H_{41}N_7O_{11}) + 2(C_{21}H_{41}N_7O_{11} \cdot \tfrac{3}{2}H_2SO_4) = 3(C_{21}H_{41}N_7O_{11} \cdot H_2SO_4)$$

(B) The methanol in which 1 mole of free base of dihydrodesoxystreptomycin and dispersed and mixed with methanolic solution of 2 moles of its trihydrochloride to cause the chemical reaction:

$$(C_{21}H_{41}N_7O_{11}) + 2(C_{21}H_{41}N_7O_{11} \cdot 3HCl) = 3(C_{21}H_{41}N_7O_{11} \cdot 2HCl)$$

In this mixture dihydrodesoxystreptomycin dihydrochloride is produced and, when acetone is added to this crystals of the substance can be obtained.

The above-mentioned five methods are the fundamental ones by which crystalline dihydrodesoxystreptomycin or dihydrostreptomycin basic salts are produced at the highest yield. That is, if these methods are practiced under limited conditions as mentioned above, they will give highest yield respectively. However, the above-described conditions are not the only ones under which dihydrodesoxystreptomycin or dihydrostreptomycin basic salts are obtained; these basic salts are also obtainable within the below-described ranges. The only point to be noticed is that in the latter case the yield will be lower than in the former case. Below, we shall describe about the range of these conditions:

When basic substance is added to the solution of normal salt of dihydrodesoxystreptomycin or dihydrostreptomycin and the pH of the mixture is raised, as described in the method 1, or when acid is added to the solution of free base of dihydrodesoxystreptomycin or dihydrostreptomycin and the pH of the solution is adjusted as described in the method 3, the highest yield may be obtained. If the matter of yield is not concerned with, the basic salt corresponding to the normal salt can also be obtained within a certain range of pH. By adding barium hydroxide to the aqueous solution of dihydrodesoxystreptomycin sesquisulfate making the range of pH within 7.2–13.0, and then by adding methanol to the filtrate, crystals of dihydrodesoxystreptomycin monosulfate can be obtained. Also, by adding sulfuric acid to the aqueous solution of free base of dihydrodesoxystreptomycin, and by adjusting pH anywhere within the range of 7.2–13.0, crystals of its monosulfate can be obtained. However, in both cases the yield is lower than when the pH gets farther from 10.0. For instance, the yield which is 98% at pH 10.0 will be 3% at pH 7.2 and 10% at pH 13.0.

At the beginning of our detailed explanation about the present invention, we asserted that the crystals of basic salts produced by the method of the present invention are the substance of a quite new form. At this opportunity, we shall illustrate below about one of the additional evidences showing this fact.

In "High pH Dihydrostreptomycin and Process Therefor" (U.S. Patent 2,683,142, July 6, 1954), it is mentioned as follows:

(A) (Lines 6–16, column 2) "Attempts have been made to modify the procedure disclosed in the prior application Serial No. 85,946, now Patent Number 2,590,141, by adjusting the pH of the reaction mixture during the crystallization of dihydrostreptomycin sulfate to a neutral or slightly alkaline pH. The effect of such adjustment, however, is merely to interfere with and prolong the crystallization step, and it is found that the product obtained still has the characteristic property of forming when dissolved in water a solution having a pH of approximately 4.5–5.0." In other words, it is described that the obtained product is only dihydrostreptomycin sesquisulfate (it is also described in lines 25–30 of column 1 of the above-mentioned U.S. patent that the pH of the aqueous solution of this sesquisalt is about 4.5). It may be added that the invention described in the U.S. patent relates to the method for producing a mixture consisting of 70–85% of dihydrostreptomycin sesquisulfate and 15–30% of dihydrostreptomycin monosulfate and does not relate to the method for obtaining monosulfate only.

(B) Furthermore, in the above-cited U.S. patent it is explained that when the method—which is based on the one hand on the fact that the mixed salt produced by this method has the property of forming, when dissolved in water, a solution having a pH within the range of pH 7–8 and on the other hand based on the means that, when dihydrostreptomycin acid addition salt is reacted by ammonium sulfate, the amount of ammonium sulfate is regulated so that less sulfate is introduced than is required to convert all of the dihydrostreptomycin acid addition salt to its sesquisulfate, i.e., less than 1.5 moles (the lowest limit being 1.2 moles) of ammonium sulfate per mole of dihydrostreptomycin—is pursued, the obtainable substance will be a mixture of dihydrostreptomycin sesquisulfate and dihydrostreptomycin monosulfate and that the proportion of their composition will be 70–85%:15–30%. However, there are considerable doubtful points regarding this statement. Clear evidences for this point are given in items (a), (b), (c) and (d) below:

(a) Dihydrostreptomycin sesquisulfate was generally known prior to the application of U.S. Patent No. 2,683,142, but the actual existence of dihydrostreptomycin monosulfate was entirely unknown prior to the discovery of this monosulfate by the inventors, and even at the time of the application of the above patent.

(b) The actual existence of this monosulfate is not clearly indicated in the specification of U.S. Patent No. 2,683,142.

(c) No experimental fact is found in said U.S. patent on determination of the mixing ratio of dihydrostreptomycin sesquisulfate and monosulfate.

(d) According to our opinion, it is believed that the method used by Wolf, who is the inventor of the above-mentioned U.S. patent, relating to the determination of mixing ratio stated in item (c) above, is as follows: it is considered that 1.5 moles sulfuric acid is present per mole of dihydrostreptomycin in dihydrostreptomycin sesquisulfate and 1 mole of sulfuric acid is present per mole of dihydrostreptomycin in dihydrostreptomycin monosulfate and then the quantity of sulfuric acid present in the mixed sulfate salt can be calculated as follows, in case of the sesquisulfate being 85% and monosulfate 15% in the above mixed sulfate salt:

$$(1.5 \text{ mole} \times 0.85) + (1 \text{ mole} \times 0.15) = 1.425 \text{ mole}$$

Also, in case of the sesquisulfate being 70% and monosulfate 30%, $$(1.5 \text{ mole} \times 0.7) + (1 \text{ mole} \times 0.3) = 1.35 \text{ mole}$$

of sulfuric acid will be present.

From the calculation as shown above, it is stated in claim 1 of the specification of the above-mentioned U.S. patent that high pH dihydrostreptomycin sulfate is a mixture of 70–85% sesquisulfate and 15–30% monosulfate; also in claim 4, it is stated that 1.2–1.4 mole of sulfate salt is used for 1 mole dihydrostreptomycin in the process for preparing the high pH dihydrostreptomycin.

From the standpoint of affirming the facts mentioned in items (a), (b), (c) and (d) to be true, there is nothing but to consider that, even though the high pH dihydrostreptomycin sulfate referred to in the above U.S. patent really indicates pH within the range of 7–8 when dissolved in water, it is a mixture containing 70–85% of known sesquisulfate and 15–30% of unknown monosulfate, in which the composition was given by apparently definite but really fictitious figures.

Furthermore, the inventor of the U.S. patent, Wolf, assumed an imaginary substance, that is, dihydrostreptomycin monosulfate whose presence was entirely unknown, and mentioned this substance in the specification.

Thus, it is not considered reasonable that the new substance which the present inventors have discovered, produced and actually introduced for the first time and made clear its properties, simultaneously and of which the existence has been proved actually and theoretically, is not patentable for a mere reason that the name is identical with that of the substance born out of imagination giving in evidence only the fact that the name and the molecular formula of the fictitious substances have been stated in the specification of U.S. Patent No. 2,683,142.

Moreover, it is positively proved by the following experiment that the monosulfate discovered by the present inventors is utterly different from the substance prepared by Wolf's method:

In the Example 3 of the cited specification 2,683,142, it was described that dihydrostreptomycin sulfate was passed through the column of anion exchange resin. The initial effluent from the column which had a pH value between 10.4 and 10.8 was not collected and it is seen that the quantity of this effluent was very little (within 5% recovery in the resin treatment); while the main effluent (95% recovery in the resin treatment) which had a pH of about 7.5 to 7.6 was collected and from this product a desired high pH dihydrostreptomycin was obtained. On the contrary, in the Example 17 of the present specification, it is described that Amberlite IRA–400 (anion exchange resin) is added to the aqueous solution of dihydrostreptomycin sesquisulfate, and, adjusting the pH of the solution to 10.1, filtered. To this filtrate is added methanol and crystals of dihydrostreptomycin monosulfate are separated out.

In the method 2, it is possible to obtain the basic salt of dihydrodesoxystreptomycin or dihydrostreptomycin by using the basic substance whose quantity is equivalent to the ranges of about ±50% of the basic substance required to neutralize the acid attached to N-methyl-L-glucosamine residue contained in the molecules of normal salt of dihydrodesoxystreptomycin or dihydrostreptomycin. However, the yield obtainable from this method is smaller than that obtainable from the method 2.

In the method 4, when 1 mole of free base of dihydrodesoxystreptomycin or dihydrostreptomycin is mixed with the acid which is within the range of −70% to +30% of the required number of moles to neutralize only two bases in the streptidine residue, crystals of basic salt can be obtained. For instance, if the acid to be added is sulfuric acid, the calculated amount of sulfuric acid must be 1 mole; however, if sulfuric acid is added within the range of 0.3–1.3 moles, crystals of dihydrodesoxystreptomycin monosulfate can also be obtained. However, the yield in this case is smaller than when 1 mole of sulfuric acid is used.

In the method 5, crystals of basic salt of dihydrodesoxystreptomycin or dihydrostreptomycin can be obtained when the normal salt of dihydrodesoxystreptomycin or dihydrostreptomycin of which the quantity corresponds to the range of 1–2.5 moles is used against 1 mole of free base of dihydrodesoxystreptomycin or dihydrostreptomycin, although in this case the yield will be lower.

Next, we shall explain about the solvents, acids, basic substance and mother crystals to be used in the method of this invention. However, as these are given only as examples, it must be noticed that alterations, amplifications or selections based on chemical common sense should be made as the case may be.

(1) Regarding solvents

The solvents dissolving free base or its normal salts of the starting material of dihydrodesoxystreptomycin or dihydrostreptomycin are water or organic solvents, especially methanol, in industrial cases. Again, the organic solvents to be added to the above-mentioned solvents for the purpose of obtaining crystals of basic salts are either one or mixture of methanol, ethanol, normal butanol, isopropanol, acetone and methyl-ethyl ketone.

For instance, in order to obtain dihydrodesoxystreptomycin monosulfate, free base or its sesquisulfate of dihydrodesoxystreptomycin to be used as starting material should be dissolved in water. And, after adding sulfuric acid in normal way when free base is used, or basic substance in normal way when sesquisulfate is used, methanol is generally added in the process of obtaining crystals of dihydrodesoxystreptomycin monosulfate from this aqueous solution. Here, methanol is to be added to the solution to incipient turbidity. When crystals begin to be separated out and the solution becomes transparent, further methanol is added, and this process is repeated until all crystals are separated out. One thing which must be attended to is that methanol should not be added in a large quantity in a single process. That is, if methanol is continued to be added until after incipient turbidity of the above-mentioned solution, amorphous basic salts will be separated out. Generally, the volume ratio between water and methanol on completion of crystallization is about 1:1.5. Of course, this ratio will be influenced by the volume of water in which free base or normal salt of the starting material of dihydrodesoxystreptomycin is dissolved at first, or, in other words, by the strength of concentartion of these substances in the aqueous solution. Generally, the desirable concentration for better yield is about 20–30%.

In order to obtain dihydrodesoxystreptomycin dihydrochloride, it will be convenient to disperse free base in methanol, or to dissolve trihydrochloride in methanol. Then, after adding prescribed hydrochloric acid in case free base is used, or prescribed basic substance in case trihydrochloride is used, acetone is added slowly to this methanol solution, and crystals of dihydrodesoxystreptomycin dihydrochloride will be separated out.

(2) Regarding acids

The kinds of acids to be added in a prescribed quantity to free base of the starting material of dihydrodesoxystreptomycin are, generally speaking, inorganic and organic acids, and phenols are also usable. However, for the industrial production of basic salt by the present invention, it will be convenient to use the following acids. They are, among inorganic acids, sulfuric acid, hydrochloric acid, phosphoric acid, and, among organic acids, acetic acid. If the object is to produce basic salt alone, the usable acids are, among inorganic ones, sulfurous acid and nitric acid; and, among organic acids, glucuronic acid, p-amino salicylic acid, nicotinic acid; then, among phenols, trichlorophenol and pentachlorophenol.

(3) Regarding basic substances

The kinds of basic substances which are usable for neutralizing only the acids attached to the one amino group contained in N-methyl-L-glucosamine residue in each molecule of normal salt of the starting material of dihydrodesoxystreptomycin or dihydrostreptomycin, and for keeping the above-mentioned solution of normal salts at prescribed pH, are inorganic and organic bases or basic ion exchange resins. Among these, basic ion exchange resins are generally usable in every case, but when inorganic and organic bases are to be used, proper kinds of normal salts of dihydrodesoxystreptomycin or dihydrostreptomycin must be used as starting material. For this purpose, selection should be made from among those which satisfy the following conditions:

(A) Bases capable of neutralizing the acid attached to the above-mentioned N-methyl-L-glucosamine residue which form a salt of insoluble nature that can be filtered off to the outside of reaction system.

(B) Bases capable of neutralizing the acid attached to the above-mentioned N-methyl-L-glucosamine residue that form a soluble salt remain in solution when the basic salts of this invention are crystallized out. For instance, when the acid attached to N-methyl-L-glucosamine residue contained in dihydrodesoxystreptomycin sesquisulfate is neutralized, barium sulfate will be precipitated if barium hydroxide of prescribed quantity is added to the above-mentioned sesquisulfate, then to the filtrate, removed of this precipitate by filtration, methanol is added and crystals of the monosulfate can be obtained.

When sodium hydroxide is used for this process, it would form as a result of neutralization sodium sulfate which, because of its being soluble in water, would remain in the solution, and when menthanol is added afterwards, the solubility of sodium sulfate in the solution would decrease according as methanol is added and its crystallization would be slow with the result that these crystals would coexist with the desired crystals of dihydrodesoxystreptomycin monosulfate, bringing about degradation of the purity of the latter. Therefore, for obtaining a pure substance, use of sodium hydroxide should be avoided.

(4) Regarding mother crystals

Generally speaking, it is known that when a certain substance is to be crystallized out of its solution, crystallization will be easier and quicker if the mother crystals are added. This general phenomenon is also the case with crystallization of basic salt of dihydrodesoxystreptomycin or streptomycin. Therefore, in the first place, fine crystals should be prepared by applying any proper one of the five methods of the present invention as mentioned above, and these fine crystals should be used as mother crystals.

The crystalline basic salts of dihydrodesoxystreptomycin or dihydrostreptomycin obtainable by the present invention have various kinds of advantageous nature in the industrial production of dihydrodesorystreptomycin or dihydrostreptomycin. Regarding this point, we shall explain below in detail:

(1) As the basic salts of dihydrodesoxystreptomycin or dihydrostreptomycin have a very good crystal nature, it is possible to produce from them simple and with good yield a pure quality of dihydrodesoxystreptomycin or dihydrostreptomycin suitable for clinical use.

Speaking generally and chemically, in order to produce any substance of a pure quality, the surest and simplest method is to obtain that substance by separating it in crystal form.

The sesquisulfate as normal salt of dihydrodesoxystreptomycin which is widely in clinical use nowadays is a normal salt of which 1 mole of dihydrodesoxystreptomycin is attached by 1.5 moles of sulfuric acid and is used as amorphous powder. The crystallization of this substance is very difficult and is impossible industrially. As the purification of dihydrodesoxystreptomycin is impossible in the form of sesquisulfate, the production or pure sesquisulfate is ordinarily made through the following process.

The aqueous solution of streptomycin sesquisulfate of impure quality is reduced with amalgamated aluminum adjusting the solution to pH 2.0–2.5 to produce dihydrodesoxystreptomycin. The reaction mixture is filtered, the filtrate is concentrated, and barium hydroxide is added so that sulfate ion in the solution is completely removed as precipitate of barium sulfate, and acetone is added to the resultant filtrate to separate out crystals of free base of pure dihydrodesoxystreptomycin. The crystals are collected and are neutralized with sulfuric acid. The neutralized solution is poured into methanol to precipitate pure dihydrodesoxystreptomycin sesquisulfate which is then collected and dried.

In this manner, as it is impossible to crystallize sesquisulfate itself, it is once led to crystals of free base as an intermediate process by which dihydrodesoxystreptomycin is purified and it is then further neutralized by sulfuric acid to produce pure sesquisulfate. However, the above-mentioned free base is comparatively an unstable substance, and although it is comparatively stable in solid state, it gradually loses stability in the state of solution. Therefore, in the process where a large quantity of free base is crystallized industrially, there sometimes takes place decomposition of the substance, causing decrease of yield. On the contrary, as basic salt of dihydrodesoxystreptomycin obtainable by the present invention is very stable even in the state of solution and has a very good crystallizing nature, it is possible to produce in a simple way and with good yield dihydrodesoxystreptomycin monosulfate of pure quality by using impure streptomycin sesquisulfate as starting material. From this starting material, dihydrodesoxystreptomycin is produced by the above-mentioned reductive reaction, and the reaction mixture is treated with barium hydroxide by any one of the methods, especially by method 1 of the present invention as described above, and adjusting the solution to about pH 10.0, methanol is added to this solution, separating out crystals of this basic salt.

Dihydrostreptomycin monosulfate has been found superior to its sesquisulfate in the crystalline nature, so the former can be used more advantageously than the latter in the following case. That is, in obtaining dihydrostreptomycin sesquisulfate out of the aqueous solution of streptomycin sesquisulfate by catalitic hydrogenation, the obtained dihydrostreptomycin will be impure if the starting material of a streptomycin is comparatively impure, and under such a circumstance, crystallization of dihydrostreptomycin sesquisulfate is very difficult; however, if the crystallization is effected after the starting material is first converted into monosulfate, crystallization will be made very easily and with good yield even from the impure starting material.

(2) With regard to the basic salts of dihydrodesoxystreptomycin or dihydrostreptomycin prepared by the method of the present invention, one of the bases contained in the molecules of dihydrodesoxystreptomycin or dihyrostreptomycin is not attached by acid but remains free, so by neutralizing the remaining base with acid, normal salt of dihydrodesoxystreptomycin or dihydrostreptomycin can be simply produced. For instance, by neutralizing the dihydrodesoxystreptomycin or dihydrostreptomycin monosulfate with suufuric acid, sesquisulfate of these can be obtained.

(3) Clinically, when preparing two or more kinds of mixed antibiotic substances for the purpose of medicating two or more kinds of antibiotic substances simultaneously, sesquisulfate of dihydrodesoxystreptomycin or dihydrostreptomycin and penicillin can not be mixed because the aqueous solution of the former has a pH of about 4.8 and penicillin is rapidly broken in this acidified pH. However, as the aqueous solution of basic salt of dihydrodesoxystreptomycin or dihydrostreptomycin shows an alkaline nature as mentioned above, the above-mentioned disadvantage can be overcome, and a mixed drug of these basic salts and acid susceptive antibiotics can safely be prepared.

As mentioned above, by the application of the method of the present invention, it is possible to produce industrially with facility and with good yield the crystals of basic salt of dihydrodesoxystreptomycin or dihydrostreptomycin where the two amino groups contained in the streptidine residue in the molecules of dihydrodesoxystreptomycin or dihydrostreptomycin are attached to acidic groups of the same sort and the one amino group contained in N-methyl-L-glucosamine residue is not attached to acid but remains free.

The following examples illustrate methods of carrying out the present invention, but it is to be understood that these examples are given by way of illustration and not of limitation.

EXAMPLE 1

10.0 g. of amorphous dihydrodesoxystreptomycin sesquisulfate (potency: 870μ/mg., corresponds to 8.7 g. of free base) is dissolved in 15 ml. of distilled water. To this is added hot aqueous solution of barium hydroxide and the pH is adjusted to 10.10 (30° C.). The precipitate of the resultant barium sulfate is removed. 30 ml. of the filtrate is mixed with methanol under stirring until immediately before a turbidity exists (35 ml. is required). Then, as small quantity of crystals is gradually separated out, further methanol is added to a turbidity of the solution. This process is repeated until crystals are separated completely. By filtering and drying them, crystals of dihydrodesoxystreptomycin monosulfate are obtained.

Yield: 8.5 g., 96.0% (calculated from potency); potency: 983μ/mg.; $[\alpha]_D^{17}$—102° (concentration: 1% in distilled water), M.P. (dec.): 245–247° C.

Analytical result.—Calculated for $C_{21}H_{41}N_7O_{11} \cdot H_2SO_4$,

C=37.89%, H=6.51%, N=14.73%, $SO_4$=14.43%.

Found: C=37.67%, H=6.38%, N=14.56%, $SO_4$=14.37%

EXAMPLE 2

10.0 g. of amorphous dihydrodesoxystreptomycin sesquisulfate (potency: 870 μ/mg., corresponds to 8.7 g. of free base) is dissolved in 20 ml. of distilled water. To this solution is added 2.2 g. of barium hydroxide dissolved in 10 ml. of hot water. Out of all sulfate ions existing in the above-mentioned sesquisulfate, ⅓ is removed as the precipitate of barium sulfate. To 40 ml. of the filtrate is added methanol under stirring until immediately before a turbidity exists (48 ml. is required). Then, as a small quantity of crystals is gradually separated out, further methanol is added to a turbidity of the solution. This process is repeated until crystals are separated out completely. By filtering and drying them, crystals of dihydrodesoxystreptomycin monosulfate are obtained.

Yield: 8.6 g., 95.8% (calculated from potency); potency: 970 μ/mg.; $[\alpha]_D^{17}$—102° (concentration: 1% in distilled water), M.P.(dec.): 245–247° C.

Analytical result.—Calculated for $C_{21}H_{41}N_7O_{11} \cdot H_2SO_4$:

C=37.89%, H=6.51%, N=14.73%, $SO_4$=14.43%.

Found: C=37.78%, H=6.59%, N=14.62%, $SO_4$=14.23%

EXAMPLE 3

10.0 g. of the crystals of free base of dihydrodesoxystreptomycin (potency: 1150 μ/mg.) is dissolved in 1 normal sulfuric acid, and the pH is adjusted to 10.30 (28°C.). To this solution is added methanol by the method as shown in Example 1 and crystals are separated. By filtering and drying them, crystals of dihydrodesoxystreptomycin monosulfate are obtained.

Yield: 11.3 g., 95.6% (calculated from potency): potency: 974 μ/mg.

EXAMPLE 4

10.0 g. of the crystals of free base of dihydrodesoxystreptomycin (potency: 1150 μ/mg.) is dissolved in 35.2 ml. of 1 normal sulfuric acid (the quantity of this sulfuric acid is the one sufficient to neutralize the two bases contained in streptidine residue existing in the molecules of the above-mentioned free base). To this solution methanol is added and crystals are separated out by the method as shown in Example 1. By filtering and drying them, crystals of dihydrodesoxystreptomycin are obtained.

Yield: 11.3 g., 96.5% (calculated from potency): potency: 982 μ/mg.

EXAMPLE 5

5.0 g. of the free base of dihydrodesoxystreptomycin (potency: 1150 μ/mg.) and 10.0 g. of amorphous dihydrodesoxystrephomycin sesquisulfate (potency: 870 μ/mg.) are dissolved in 50 ml. of distilled water. To this solution, methanol is added, and crystals are separated out by the method shown in Example 1. These crystals are filtered and dried, and crystals of dihydrodesoxystreptomycin are obtained.

Yield: 14.2 g., 95.5% (calculated from potency); potency: 972 μ/mg.

EXAMPLE 6

500 ml. of a concentrated solution ($20 \times 10_4$ μ/cc. concentration: 38.5%) rich in streptomycin sesquisulfate obtained from streptomycin broth treated with ion exchange resin and still in impure state (this dried substance has the potency of 520 μ/mg. and the purity is 65.2%) is treated with 20 g. of amalgamated aluminum maintaining the pH of the solution at about 2.0–2.5 with sulfuric acid. Then, after the reaction is finished, a hot aqueous solution of barium hydroxide is added to the reaction mixture and, with a pH of 10.0 (18° C.), filtered. The combined filtrate and the washings are concentrated under reduced pressure. 500 ml. of the concentrated solution (concentration: $18.6 \times 10_4$μ/cc., total potency: $93 \times 10^6$ μ/cc. total) is heated to 40° C., and methanol is added under agitation until immediately before a turbidity exists. (550 ml. is required). It is then allowed to cool for several hours at room temperature until most of the crystals are separated out. At this time, further methanol is added to the solution before a turbidity exists. This process is repeated until the crystals are separated out completely. The crystals thus separated out are filtered and dried and crystals of dihydrodesoxystreptomycin monosulfate are obtained.

Yield: 88.5 g., 83.7% (calculated from potency); potency: 946 μ/mg.

EXAMPLE 7

8.0 g. of amorphous dihydrodesoxystreptomycin sesquisulfate (potency: 870 μ/mg., corresponds to 6.96 g. of free base) is dissolved in 30 ml. of distilled water. To this is added Amberlite IRA–400, and adjusting the solution to pH 10.20 (14° C.,), then filtered. To 44 ml. of the filtrate methanol is added, and crystals are separated out by the method shown in Example 1. By filtering and drying them, crystals of dihydrodesoxystreptomycin monosulfate are obtained.

Yield: 6.8 g., 95.6% (calculated from potency); potency: 978 μ/mg.

EXAMPLE 8

10.0 g. of amorphous dihydrodesoxystreptomycin sesquiphosphate (potency: 860 μ/mg., corresponds to 8.6 g. of free base) is dissolved in 30 ml. of distilled water, and, by adding 2.2 g. of barium hydroxide dissolved in 10 ml. of hot water, ⅓ of total phosphate ions existing in the above-mentioned sesquiphosphate is removed as precipitate of barium phosphate. To 50 ml. of the filtrate is added methanol (about 60 ml. is required) under agitation until immediately before a turbidity exists. After allowing to cool overnight at room temperature, the separated crystals are filtered and dried, and crystals of dihydrodesoxystreptomycin monophosphate are obtained.

Yield: 8.3 g., 92.0% (calculated from potency); potency: 954 μ/mg.

Analytical result.—Calculated for $C_{21}H_{41}N_7O_{11} \cdot H_3PO$–: C=37.89%, H=6.66%, N=14.73%. Found: C=37.78%, H=6.58%, N=14.62%.

EXAMPLE 9

5.0 g. of free base of dihydrodesoxystreptomycin (potency: 1150 μ/mg.) is dissolved by adding the methanolic solution of 1 normal dried hydrogen chloride (17.5 ml. is required) and pH is adjusted to 9.8 (20° C.). To this is added dehydrated acetone until immediately before a turbidity exists and left for a few days at room temperature. The separated crystals are filtered and dried, and crystals of dihydrodesoxystreptomycin dihydrochloride are obtained.

Yield: 4.8 g., 81.8% (calculated from potency); potency: 980 μ/mg.

Analytical result.—Calculated for $C_{21}H_{41}U_7O_{11} \cdot 2HCl$: C=39.38%, H=6.77%, N=15.31%, Cl=11.07%. Found: C=39.27%, H=6.69%, N=15.42%, Cl=11.21%.

EXAMPLE 10

5.0 g. of free base of dihydrodesoxystreptomycin (potency: 1150 μ/mg.) is dissolved by adding a solution of 5% acetic methanol (21.0 ml. is required) and pH is adjusted to 10.1 (14° C.). To this is added dehydrated acetone until immediately before a turbidity exists and is allowed to cool overnight. The separated crystals are filtered and dried, and crystals of dihydrodesoxystreptomycin diacetate are obtained.

Yield: 5.0 g., 82.2% (calculated from potency); potency: 945 μ/mg.

Analytical result.—Calculated for $$C_{21}H_{41}N_7O_{11} \cdot 2(C_2H_4O_2):$$

C=54.14%, H=7.18%, N=14.26%. Found: C=54.31%, H=7.25%, N=14.36%.

EXAMPLE 11

20.0 g. of amorphous dihydrostreptomycin sesquisulfate (potency: 770 μ/mg., corresponds to 15.4 g. of free base) is dissolved in 60 ml. of distilled water, and, by adding 4.3 g. of barium hydroxide dissolved in 20 ml. of hot water, ⅓ of total sulfate ion existing in the above-mentioned sesquisulfate is removed as precipitate of barium sulfate. To 100 ml. of the filtrate is added methanol (85 ml. is required) under agitation until immediately before a turbidity exists. A little time after this, when a small quantity of crystals begins to be separated out gradually, further methanol is added to an incipient turbidity in the supernatant filtrate. This process is repeated until all crystals are separated out completely. The separated crystals are filtered and dried, and crystals of dihydrostreptomycin monosulfate are obtained.

Yield: 17.5 g., 95.7% (calculated from potency); potency: 842 μ/mg. $[\alpha]_D^{17}$—90° (concentration: 1% in distilled water), M.P. (dec.) 258–260° C.

Analytical result.—Calculated for $$C_{21}H_{41}N_7O_{11} \cdot H_2SO_4$$

C=37.00%, H=6.36%, N=14.38%, $SO_4$=14.09%. Found: C=36.66%, H=6.25%, N=14.27%, $SO_4$=14.13%.

EXAMPLE 12

10.0 g. of amorphous dihydrostreptomycin sesquisulfate (potency: 770 μ/mg., corresponds to 7.7 g. of free base) is dissolved in 30 ml. of distilled water, and after adding a hot aqueous solution of barium hydroxide with the pH adjusted to 9.8 (25° C.), precipitate of separated barium sulfate is removed. To 50 ml. of the filterate is added methanol (43 ml. is required) under agitation until imsulfate is removed. To 50 ml. of the filtrate is added mediately before a turbidity exists. Then, when a small quantity of crystals begins to be separated out gradually, further methanol is added until a turbidity exists. This process is repeated until all crystals are separated out completely. They are filtered and dried, and crystals of dihydrodesoxystreptomycin sulfate are obtained.

Yield: 8.8 g., 96.0% (calculated from potency); potency: 840 μ/mg., $[\alpha]_D^{17}$ —90° (concentration: 1% in distilled water), M.P. (dec.) 258–260° C.

Analytical result.—Calculated for $C_{21}H_{41}N_7O_{12} \cdot H_2SO_4$: C = 37.00%, H= 6.36%, N = 14.38%, $SO_4$ = 14.09%. Found: C = 36.56%, H = 6.42%, N = 14.33%, $SO_4$ =14.15%.

EXAMPLE 13

10.0 g. of crystals of free base of dihydrostreptomycin (potency: 980 µ/mg.) is dissolved in 34.9 ml. of normal sulfuric acid (this is a required quantity to neutralize 2 bases in streptidine residue existing in the molecule of the above-mentioned free base). To this solution is added methanol, and crystals are separated out by the same treatment as indicated in Example 11. They are filtered and dried, and crystals of dihydrostreptomycin monosulfate are obtained.

Yield: 11.0 g., 93.2% (calculated from potency); potency: 848 µ/mg.

EXAMPLE 14

10.0 g. of crystals of free base of dihydrostreptomycin (potency: 980 µ/mg.) is dissolved by adding 1 normal sulfuric acid and the pH of the solution is adjusted to 10.0 (13° C.). To this solution is added methanol, and crystals are separated out by the method as indicated in Example 11. These crystals are filtered and dried, and crystals of dihydrostreptomycin monosulfate are obtained.

Yield: 11.1 g., 94.8% (calculated from potency); potency: 837 µ/mg.

EXAMPLE 15

3.0 g. of crystals of free base of dihydrostreptomycin (potency: 890 µ/mg.) and 6.0 g. of amorphous dihydrostreptomycin sesquisulfate (potency: 770 µ/mg.) are dissolved in 40 ml. of distilled water. To this solution is added methanol and crystals are separated out by the method as explained in Example 11. These crystals are filtered and dried, and crystals of dihydrostreptomycin monosulfate are obtained.

Yield: 8.5 g., 94.5% (calculated from potency); potency: 836 µ/mg.

EXAMPLE 16

500 ml. of a concentrated solution ($22 \times 10^4$ µ/cc., concentration: 35.3%) rich in streptomycin sesquisulfate obtained from streptomycin broth treated with ion exchange resin and still in impure state (this dried substance has the potency of 623 µ/mg. and the purity is 78.0%) is submitted to catalytic hydrogenation by adding platinum oxide catalyst. The filtrate is removed of the catalyst and to this is added hot aqueous solution of barium hydroxide and, adjusting the pH of the solution to 9.90 (22° C.), the solution is filtered. To 650 ml. of the filtrate (concentration: $16.0 \times 40^4$ µ/cc., total potency: $104 \times 10^6$ µ/cc., total) is added methanol (520 ml. is required) under agitation until immediately before a turbidity exists. After this, when crystals begin to be separated out gradually, further methanol is added until a turbidity exists. This process is repeated until all crystals are separated out completely. These crystals are filtered and dried, and crystals of dihydrostreptomycin monosulfate are obtained.

Yield: 110 g., 83.0% (calculated from potency); potency: 830 µ/mg.

EXAMPLE 17

5.0 g. of amorphous dihydrostreptomycin sesquisulfate (potency: 770 µ/mg., corresponds to 3.85 g. of free base) is dissolved in 20 ml. of distilled water and to this is added Amberlite IRA–400, and, adjusting the pH of the solution to 10.1 (14° C.), filtered. To 25 ml. of the filtrate is added methanol and crystals are separated out by the method as explained in Example 11. These crystals are filtered and dried, and crystals of dihydrostreptomycin monosulfate are obtained.

Yield: 4.3 g., 94.0% (calculated from potency); potency: 841 µ/mg.

EXAMPLE 18

10.0 g. of amorphous dihydrostreptomycin sesquiphosphate (potency: 760 µ/mg., corresponds to 7.6 g. of free base) is dissolved in 30 ml. of distilled water. To this is added 2.15 g. of barium hydroxide dissolved in 10 ml. of hot aqueous solution, and ⅓ of the total phosphate ions existing in the above-mentioned sesquiphosphate is removed as the precipitate of barium phosphate. To 50 ml. of the filtrate is added methanol until immediately before a turbidity exists (41 ml. is required) and is allowed to cool overnight at room temperature. The separated crystals are filtered and dried, and crystals of dihydrostreptomycin monophosphate are obtained.

Yield: 8.3 g., 91.0% (calculated from potency); potency: 834 µ/mg.

*Analytical result.*—Calculated for $C_{21}H_{41}N_7O_{12} \cdot H_3PO_4$: C = 37.00%, H = 6.51%, N = 14.39%. Found: C = 36.79%, H = 6.25%, N = 14.35%.

EXAMPLE 19

To 5.0 g. of crystals of free base of dihydrostreptomycin (potency: 980 µ/mg.) is added a solution of 1 normal dried methanol chloride and dissolved and pH of the solution is adjusted to 10.1 (11° C.) (17.2 ml. is required). To this is added anhydrous acetone until immediately before a turbidity exists and allowed to stand for a few days at room temperature. The separated crystals are filtered and dried, and crystals of dihydrostreptomycin dihydrochloride are obtained.

Yield: 4.8 g., 83.8% (calculated from potency); potency: 855 µ/mg.

*Analytical result.*—Calculated for $C_{21}H_{41}N_7O_{12} \cdot 2HCl$: C=38.42%, H=6.60%, N=14.94%, Cl=10.80%. Found: C=38.58%, H=6.49%, N=14.68%, Cl=10.75%.

EXAMPLE 20

5.0 g. of crystals of free base of dihydrostreptomycin (potency: 980 µ/mg.) is dissolved by adding methanolic solution of 5% acetic acid (20 ml. is required) and pH of the solution is adjusted to 10.0 (13° C.). To this is added anhydrous acetone until immediately before a turbidity exists and left for few days at room temperature. The separated crystals are filtered and dried, and crystals of dihydrostreptomycin diacetate are obtained.

Yield: 4.8 g., 1.8% (calculated from potency); potency: 835 µ/mg.

*Analytical result.*—Calculated for

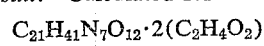

$$C_{21}H_{41}N_7O_{12} \cdot 2(C_2H_4O_2)$$

C=52.91%, H=7.02%, N=13.93%. Found: C=52.79%, H=7.13%, N=13.68%.

Modification may be made in carrying out the present invention without departing from the spirit and scope thereof, and our invention is to be limited only by the appended claims.

Having thus disclosed our invention, we claim and desire to secure by Letters Patent:

1. A crystalline product consisting of basic salt of reduction product of streptomycin selected from the group consisting of dihydrodesoxystreptomycin and dihydrostreptomycin, wherein the primary amino group contained in each of the streptidine residues of said streptomycin compounds are combined with an acid which is reactive with a primary amino group and wherein the secondary amino group contained in each of the N-methyl-L-glucosamine residues of said streptomycin compounds is in the free base form.

2. A crystalline product consisting of dihydrodesoxystreptomycin monosulfate, wherein the primary amino groups contained in the streptidine residue of said streptomycin compound are combined with sulfuric acid and wherein the secondary amino group contained in the N-methyl-L-glucosamine residue of said streptomycin compound is in the free base form.

3. A crystalline product consisting of dihydrostreptomycin monosulfate, wherein the primary amino groups contained in the streptidine residue of said streptomycin compound are combined with sulfuric acid and wherein the secondary amino group contained in the N-methyl-glucosamine residue of said streptomycin compound is in the free base form.

4. A crystalline product consisting of dihydrodesoxystreptomycin dihydrochloride, wherein the primary amino groups contained in the streptidine residue of said streptomycin compound are combined with hydrochloric acid and wherein the secondary amino group contained in the N-methyl-glucosamine residue of said streptomycin compound is in the free base form.

5. A crystalline product consisting of dihydrostreptomycin dihydrochloride, wherein the primary amino groups contained in the streptidine residue of said streptomycin compound are combined with hydrochloric acid and wherein the secondary amino group contained in the N-methyl-glucosamine residue of said streptomycin compound is in the free base form.

6. A crystalline product consisting of dihydrodesoxystreptomycin monophosphate, wherein the primary amino groups contained in the streptidine residue of said streptomycin compound are combined with phosphoric acid and wherein the secondary amino group contained in the N-methyl-glucosamine residue of said streptomycin compound is in the free base form.

7. A crystalline product consisting of dihydrostreptomycin monophosphate, wherein the primary amino groups contained in the streptidine residue of said streptomycin compound are combined with phosphoric acid and wherein the secondary amino group contained in the N-methyl-glucosamine residue of said streptomycin compound is in the free base form.

8. A crystalline product consisting of dihydrodesoxystreptomycin diacetate, wherein the primary amino groups contained in the streptidine residue of said streptomycin compound are combined with acetic acid and wherein the secondary amino group contained in the N-methyl-glucosamine residue of said streptomycin compound is in the free base form.

9. A crystalline product consisting of dihydrostreptomycin diacetate, wherein the primary amino groups contained in the streptidine residue of said streptomycin compounds are combined with acetic acid and wherein the secondary amino group contained in the N-methyl-glucosamine residue of said streptomycin compound is in the free base form.

10. The process for obtaining at the highest yield crystals of material selected from the group consisting of dihydrodesoxystreptomycin monosulfate and dihydrostreptomycin monosulfate that comprises adding barium hydroxide to the aqueous solution of material selected from the group consisting of dihydrodesoxystreptomycin sesquisulfate and dihydrostreptomycin sesquisulfate and adjusting the pH of the solution in both cases to about 10.0.

11. The process for obtaining at the highest yield crystals of material selected from the group consisting of dihydrodesoxystreptomycin dihydrochloride and dihydrostreptomycin dihydrochloride that comprises adding silver oxide to the methanolic solution of material selected from the group consisting of dihydrodesoxystreptomycin trihydrochloride and dihydrostreptomycin trihydrochloride and adjusting the pH of the solution in both cases to about 10.0.

12. The process for obtaining at the highest yield crystals of material selected from the group consisting of dihydrodesoxystreptomycin monophosphate and dihydrostreptomycin monophosphate that comprises adding barium hydroxide to the aqueous solution of material selected from the group consisting of dihydrodesoxystreptomycin sesquiphosphate of dihydrostreptomycin sesquiphosphate and adjusting the pH of the solution in both cases to about 10.2.

13. The process for obtaining at the highest yield crystals of material selected from the group consisting of dihydrodesoxystreptomycin diacetate and dihydrostreptomycin diacetate that comprises adding ammonium hydroxide to the methanolic solution of material selected from the group consisting of dihydrodesoxystreptomycin triacetate and dihydrostreptomycin triacetate and by adjusting the pH of the solution in both cases to about 10.5.

14. The method of purifying a reduction product of streptomycin selected from the group consisting of dihydrodesoxystreptomycin and dihydrostreptomycin and the normal salts thereof comprising forming a solution of said reduction product, adjusting the pH of said solution to about 10, thereby forming a basic salt of said reduction product, and crystallizing said salt from said solution.

15. The process defined by claim 14 wherein two equivalents of acid which is reactive with a primary amino group is added to a solution containing one mol of free base selected from the group consisting of dihydrodesoxystreptomycin and dihydrostreptomycin.

16. The method defined by claim 14 wherein a solution containing one mol of a free base selected from the group consisting of dihydrodesoxystreptomycin and dihydrostreptomycin is mixed with a solution containing two mols of a normal salt selected from the group consisting of dihydrodesoxystreptomycin and dihydrostreptomycin normal salts of an acid which is reactive with a primary amino group.

17. The method defined by claim 15, wherein the acid is selected from the group consisting of sulfuric acid, phosphoric acid, hydrochloric acid, and acetic acid.

18. The method defined by claim 16, wherein the normal salts are selected from the group consisting of the sulfates and hydrochlorides of dihydrodesoxystreptomycin and dihydrostreptomycin.

References Cited by the Examiner
UNITED STATES PATENTS

| | | | |
|---|---|---|---|
| 2,531,869 | 11/1950 | Alburn et al. | 260—210 |
| 2,683,142 | 7/1954 | Wolf | 260—210 |
| 2,803,650 | 8/1957 | Yabuta et al. | 260—210 |

LEWIS GOTTS, *Primary Examiner.*

UNITED STATES PATENT OFFICE
CERTIFICATE OF CORRECTION

Patent No. 3,221,009            November 30, 1965

Teijiro Yabuta et al.

It is hereby certified that error appears in the above numbered patent requiring correction and that the said Letters Patent should read as corrected below.

In the Letters Patent (only), page 3 of the printed specification comprising columns 13 to 16 is out of place and should appear after page 4 comprising columns 9 to 12; column 9, line 33, for "concentartion" read -- concentration --; column 10, line 48, for "simple" read -- simply --; column 13, lines 14 and 25, for "$10_4$", each occurrence, read -- $10^4$ --; line 67, for "$H_3PO$-" read -- $H_3PO_4$ --; column 14, line 8, for "$C_{21}H_{41}U_7O_{11} \cdot 2HCl$" read -- $C_{21}H_{41}N_7O_{11} \cdot 2HCl$ --; line 60, for "filterate" read -- filtrate --; same column 14, line 62, strike out "sulfate is removed. To 50 ml. of the filtrate is added".

Signed and sealed this 27th day of September 1966.

(SEAL)
Attest:

ERNEST W. SWIDER            EDWARD J. BRENNER
Attesting Officer            Commissioner of Patents